US008356985B2

(12) United States Patent
Gray. Jr. et al.

(10) Patent No.: US 8,356,985 B2
(45) Date of Patent: Jan. 22, 2013

(54) SAFE OVER-CENTER PUMP/MOTOR

(75) Inventors: Charles L. Gray. Jr., Pinckney, MI (US); Anthony J. Tesoriero, Ann Arbor, MI (US)

(73) Assignee: The United States of America, as represented by the Administrator of the U.S. Environmental Protection Agency, Washington, DC (US)

( * ) Notice: Subject to any disclaimer, the term of this patent is extended or adjusted under 35 U.S.C. 154(b) by 1075 days.

(21) Appl. No.: 11/540,089

(22) Filed: Sep. 29, 2006

(65) Prior Publication Data

US 2008/0080985 A1  Apr. 3, 2008

(51) Int. Cl.
F04B 1/26 (2006.01)

(52) U.S. Cl. ...................... 417/222.1; 60/464

(58) Field of Classification Search ............ 417/53, 417/222.1, 269; 60/403, 445, 468; 91/418, 91/472, 505, 169, 436, 437; 251/319; 92/51
See application file for complete search history.

(56) References Cited

U.S. PATENT DOCUMENTS

| | | | | |
|---|---|---|---|---|
| 3,152,614 A | * | 10/1964 | Carls | 137/625.69 |
| 3,431,857 A | * | 3/1969 | Jennings et al. | 417/218 |
| 3,790,129 A | * | 2/1974 | Pauls | 251/297 |
| 3,808,952 A | * | 5/1974 | Knaak | 91/505 |
| 4,297,918 A | * | 11/1981 | Perry | 476/10 |
| 4,343,383 A | * | 8/1982 | Brosius et al. | 188/296 |
| 4,351,357 A | * | 9/1982 | Orme | 137/446 |
| 4,381,702 A | | 5/1983 | Myers | |
| 4,870,819 A | * | 10/1989 | Walzer | 60/422 |
| 5,017,094 A | | 5/1991 | Graf et al. | 417/218 |
| 5,074,335 A | * | 12/1991 | Beuermann | 137/625.69 |
| 5,495,912 A | | 3/1996 | Gray, Jr. et al. | 180/165 |
| 5,669,265 A | * | 9/1997 | Adler | 74/335 |
| 5,791,128 A | * | 8/1998 | Rogalsky | 56/14.5 |
| 5,881,629 A | * | 3/1999 | Gollner et al. | 91/505 |
| 5,969,431 A | * | 10/1999 | Miller et al. | 307/10.1 |
| 6,223,828 B1 | * | 5/2001 | Paulson et al. | 171/63 |
| 6,508,059 B1 | * | 1/2003 | Takada et al. | 60/454 |
| 6,681,571 B2 | * | 1/2004 | Bailey et al. | 60/489 |
| 6,876,098 B1 | | 4/2005 | Gray, Jr. | 290/40 D |
| 6,998,727 B2 | | 2/2006 | Gray, Jr. | 290/40 C |
| 7,014,429 B2 | | 3/2006 | Gray, Jr. et al. | 417/269 |
| 7,305,914 B2 | | 12/2007 | Gray, Jr. | 91/462 |
| 7,337,869 B2 | | 3/2008 | Gray, Jr. et al. | 180/307 |
| 2006/0068970 A1 | | 3/2006 | Rose | 477/34 |

FOREIGN PATENT DOCUMENTS

CA    1 164 725    4/1984
DE    35 18 434 A1    11/1986

* cited by examiner

Primary Examiner — Devon Kramer
Assistant Examiner — Amene Bayou
(74) Attorney, Agent, or Firm — David H. Read (57) ABSTRACT

A fail-safe system for a hybrid vehicle employing an over-center variable-displacement hydraulic motor includes an actuator configured to stroke the motor to a zero angle if each of two control ports is supplied with fluid at an equal pressure. A control valve is configured, in the event of loss of power to the valve, to default to a position in which high-pressure fluid is supplied to both control ports. A pilot-controlled check valve is coupled between high- and low-pressure ports of the motor such that, during normal operation, passage of fluid through the check valve from the high-pressure port to the low-pressure port is checked, while passage of fluid through the check valve from the second port to the first port is enabled. When the pilot control is activated, passage of fluid in the opposite direction is also enabled.

50 Claims, 8 Drawing Sheets

SAFE OVER-CENTER PUMP/MOTOR

BACKGROUND OF THE INVENTION

1. Field of the Invention

The disclosed embodiments are directed generally to fluid power systems employing over-center motors, and, in particular, to fail-safe operations that are configured to remove output torque from a fluid motor in the event of a malfunction in the associated system.

2. Description of the Related Art

In recent years, significant interest has been generated in hybrid vehicle technology as a way to improve fuel economy and reduce the environmental impact of the large number of vehicles in operation. The term hybrid is used in reference to vehicles employing two or more power sources to provide motive energy to the vehicle. For example, hybrid electric vehicles are currently available that employ an internal combustion engine and a generator, which generates electricity to be stored in a battery of storage cells. This stored power is then used, as necessary, to drive an electric motor coupled to the drive-train of the vehicle.

There is also interest in the development of hybrid hydraulic vehicles, due to the potential for greater fuel economy, and a lower environmental impact than hybrid electric vehicles. According to one configuration, a hybrid hydraulic vehicle employs an internal combustion engine (ICE) to drive a hydraulic pump, which pressurizes hydraulic fluid. The pressurized fluid is stored in an accumulator and later used to drive a hydraulic motor coupled to the drive wheels of the vehicle.

There is a class of hydraulic machines that may be employed in hybrid operation that includes a rotating barrel having a plurality of cylinders, and pistons reciprocating within the cylinders. The barrel is configured to rotate over a valve plate having inlet and outlet ports. The barrel rotates over the valve plate, and fluid passes into, and out of, the cylinders of the barrel. In a hydraulic pump, fluid is drawn into each cylinder from a low-pressure inlet port and forced out of the cylinder to a high-pressure outlet port. In a hydraulic motor, fluid from a high-pressure inlet enters each cylinder in turn and vents to a low-pressure outlet. Some machines, commonly referred to as pump/motors, are configured to operate as pumps or motors, according to how fluid is applied to the machine.

One type of pump/motor is a bent-axis pump/motor. The operation of a typical bent-axis pump/motor will be described with reference to its operation as a motor. Operation of such devices in "pump" mode will not be described inasmuch as such operation will be clear to one having ordinary skill in the art, in view of the following description.

Figure 1A:
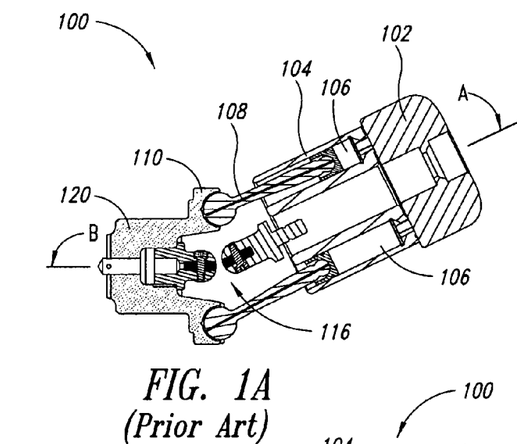
FIGS. 1A-1C show side elevation views of a portion of an over-center bent-axis motor at various stroke angles, such as is known in the art.
Figure 1B:
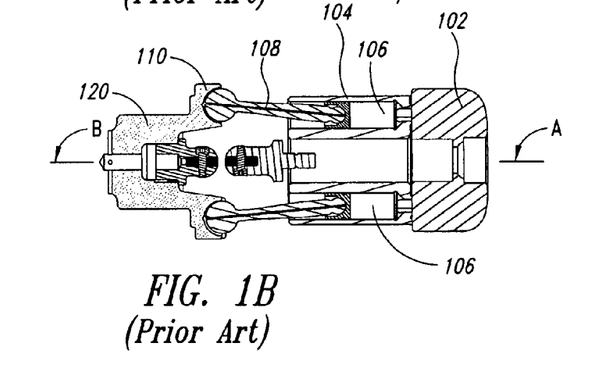
Figure 1C:
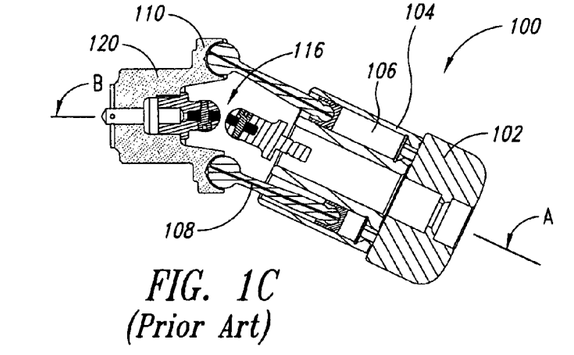

FIGS. 1A-1C show sectional views of a portion of an over-center bent-axis pump/motor 100 according to known art. The motor 100 includes a valve plate 102 and a cylinder barrel 104, having a plurality of cylinders 106 within which pistons 108 travel reciprocally. Each of the pistons 108 engages a respective socket formed in a drive plate 110. The drive plate 110 is coupled to an output shaft 120 that is rotationally driven by the motor 100.

The cylinder barrel 104 is configured to rotate around a first axis A. The drive plate 110 rotates around an axis B, and is coupled to the rotating cylinder barrel 104 by a constant velocity joint 116 (only portions of which are shown in FIGS. 1A-1C). Accordingly, the cylinder barrel 104 and the drive plate 110 rotate at a common rate.

The valve plate 102, barrel 104, and pistons 108, which define axis A, are configured to rotate, i.e., change angle, with respect to the drive plate 110, which defines axis B, for the purpose of varying the displacement volume of the pump/motor 100. The degree of rotation of axis A away from a coaxial relationship with axis B is typically referred to as the stroke angle of the device. FIG. 1A shows the motor 100 stroked to a positive angle, FIG. 1B shows the motor 100 stroked to a zero angle, and FIG. 1C shows the motor 100 stroked to a negative angle.

Figure 2A:
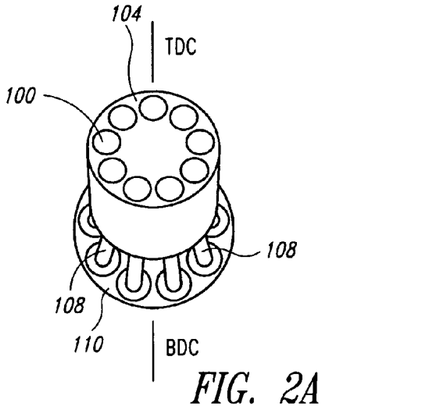
FIGS. 2A-2C show top plan views of the motor of FIGS. 1A-1C, respectively.
Figure 2B:
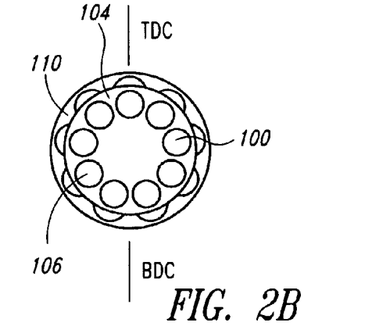
Figure 2C:
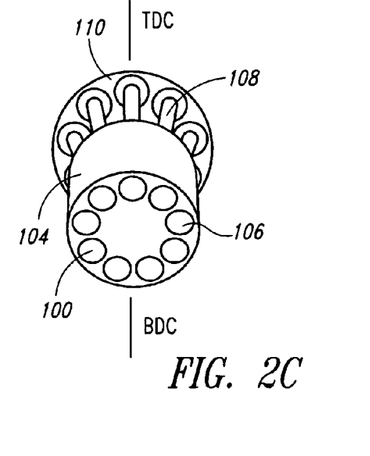

FIGS. 2A-2C show the portion of the motor 100 viewed from the right as seen in FIGS. 1A-1C, respectively, with the valve plate 102 removed. The motor 100 shown in FIGS. 1A-1C is depicted as having cylinders directly opposite one another such that when one cylinder 106 is at top-dead-center (TDC), another will be at bottom-dead-center (BDC). This arrangement is pictured to provide a view of cylinders 106 at both TDC and BDC in the same figure. However, in practice (and as pictured in FIGS. 2A-2C), most hydraulic motors employ an odd number of cylinders, typically seven or nine.

In operation, as the piston cylinders 106 rotate around the axis A with respect to the valve plate 102, high-pressure fluid is valved into each cylinder 106 as it passes top-dead-center (TDC). The high-pressure fluid applies a driving force on the face of the piston 108, which acts axially on the piston 108 with respect to axis A. This force is transferred by the piston 108 to the drive plate 110. As each piston 108 passes bottom-dead-center (BDC), the fluid is vented from the cylinder 106, which allows the piston 108 to be pushed back into the cylinder as the barrel 104 rotates it back toward TDC. For the purpose of this discussion, it will be assumed that as the cylinders 106 rotate to the left of TDC or BDC, as viewed in FIGS. 2A-2C, they are pressurized at high pressure, while, as the cylinders rotate to the right of TDC or BDC, they are pressurized at low pressure.

Referring to FIGS. 1A and 2A, it may be seen that, with the motor at a positive-stroke angle, the pressure exerted on the pistons 108 in the cylinders 106 on the high-pressure side of the barrel 104 tends to drive the drive plate 110 in a counter-clockwise direction, as viewed in FIG. 2A. The amount of torque generated is directly related to the stroke angle of the motor. As the stroke angle diminishes toward zero, as shown in FIGS. 1B and 2B, the output torque also diminishes toward zero. However, as the motor passes a zero-stroke angle and moves to a negative-stroke angle, as shown in FIGS. 1C and 2C, the pressure will tend to drive the motor in the clockwise direction. Thus, the motor is reversible by passing zero, or "over-center" from a positive- to a negative-stroke angle, or vice-versa. If the motor 100 is caused to rotate against the applied torque, it will function as a pump, drawing fluid into the cylinders on the low-pressure side, and forcing the fluid out of the cylinders on the high-pressure side. This is in contrast to a positive-angle motor, in which the motor cannot be stroked to a negative angle. In such a motor, the polarity of the fluid pressure must be reversed in order to reverse the direction of torque.

BRIEF SUMMARY OF THE INVENTION

According to an embodiment of the invention, a fluid power system is provided, including an over-center fluid operated motor having a first port for a high-pressure fluid supply and a second port for a low-pressure fluid supply. A pilot-controlled check valve is coupled between the first and second ports such that during normal operation, passage of fluid through the check valve from the first port to the second port is checked, while passage of fluid through the check valve from the second port to the first port is enabled. When the pilot control is activated, passage of fluid through the check valve from the first port to the second port is enabled.

The system may include an actuation mechanism, including first and second fluid control ports, coupled to the motor and configured to control changes in displacement of the motor. The actuation mechanism is arranged to change the displacement of the motor in a positive direction, up to a maximum positive-displacement angle, when a higher fluid pressure is present at the first control port relative to a fluid pressure present at the second port, and to change the displacement of the motor in a negative direction, up to a maximum negative-displacement angle, when a higher fluid pressure is present at the second control port relative to a fluid pressure present at the first control port. The actuation mechanism is further configured to change the displacement of the motor to a zero-displacement angle when an equal fluid pressure is present at each of the first and second ports. The actuation mechanism may include a push-pull type actuator, or, alternatively, may include a pair of actuators in a push-push configuration.

According to an embodiment, the fluid system includes a control valve having first and second output ports in fluid communication with the first and second fluid control ports, respectively, of the actuation mechanism. The control valve is configured to close the first and second output ports while in a first valve position; to place, while in a second valve position, the first output port in fluid communication with a high-pressure fluid source and the second output port in fluid communication with a low-pressure fluid source; to place, while in a third valve position, the first output port in fluid communication with the low-pressure fluid source and the second output port in fluid communication with the high-pressure fluid source; and to place, while in a fourth valve position, the first and second output ports in fluid communication with the high-pressure fluid source. Additionally, the control valve comprises a valve spring configured to bias the valve toward the fourth valve position, and a solenoid control configured to bias the valve away from the fourth valve position with a bias level selectable according to a level of electrical current in the solenoid, such that, in the absence of an electric current, the valve spring moves the valve to the fourth valve position.

DETAILED DESCRIPTION OF THE INVENTION

It is well known in the art that many hydraulic machines can be operated as pumps or motors, depending upon the direction of torque relative to the direction of rotation. In the present description, the term motor is to be construed to include motors, pumps, and pump/motors. To distinguish between motors limited to positive-stroke angles and motors capable of positive- and negative-stroke angles, the former will be referred to as positive-angle motors, while the latter will be referred to as over-center motors. While the embodiments described herein are generally configured for hydraulic fluid operation, the term fluid is to be construed to include both hydraulic and pneumatic fluids. Terms such as input, output, supply, and control are used to refer to fluid ports and transmission lines. These terms are for convenience only, and are not limiting with respect to the function or operation of the structures described. For example, a valve port coupled via a transmission line to a high-pressure fluid source may be referred to as a high-pressure input port, even though it will be understood that fluid may flow in either direction between the port and the fluid source, depending on the mode of operation of the associated system.

While the motor operation described with reference to the disclosed embodiments are bent-axis type motors, it is well known that other types of fluid motors, including swashplate and radial piston motors, for example, can be configured for over-center operation. Accordingly, the scope of the invention is not limited to bent-axis motors.

As described with reference to FIGS. 1A-2C, an over-center motor is configured to be stroked to both positive- and negative-stroke angles as required. Such motors have several advantages over the more common positive-angle motors, which are configured to be stroked in a range between zero- and some positive-stroke angle. In particular, fluid switching is much simpler in comparison to a positive-angle motor. In order to reverse the torque of an over-center motor, it is merely necessary to stroke from a positive angle to a negative angle, or vice-versa, while in a positive-angle motor, the polarity of the fluid ports must be reversed, which requires switching valves capable of high-speed switching of high-pressure fluids at very high flow rates. Such valves are a significant source of pressure drop in fluid supply due to the convoluted channels the fluid must pass through.

It will be recognized that, in most fluid power systems employing variable displacement machines, it is important that the motor be easily returnable to a zero-displacement condition in order to remove torque from the output shaft of the motor. Of course, in a positive-angle motor, the zero-stroke angle position is at one extreme of the range of motion of the machine; thus it only requires that an actuator controlling the angle of the motor be charged to move toward that extreme as far as possible. When the motor will not travel further, it is at zero. On the other hand, in the case of an over-center motor, such an action would drive the motor to its maximum displacement in that direction, rather than a displacement of zero. An angle-control actuator must be stroked to an intermediate point to bring the motor to a zero angle. This issue is generally not a major problem, since modern systems include sensors or other means for providing feedback to an actuator controller to allow the controller to adjust the angle until there is no output torque.

However, when such motors are used in hybrid vehicle systems, the safety of the occupants of the vehicle is of significant concern. It must be assumed that, over the lifetime of a vehicle, there will be malfunctions in the mechanical and electrical systems. It is therefore desirable to minimize the potential danger associated with such malfunctions. For example, if a fluid switch controlling an actuator were to freeze due to power loss or a particle of grit in a valve, the actuator could continue moving in a given direction, which would drive the motor to a maximum displacement. This would be the equivalent of driving the vehicle at its maximum acceleration, and the operator would be unable to reduce power. Even cutting the power to the controller might be ineffective, at least until all stored fluid pressure is exhausted. Various embodiments of the present invention are directed to fail-safe devices and systems that are configured to either automatically stroke the motor to zero or shut off the high-pressure fluid supply to the motor.

Figure 3:
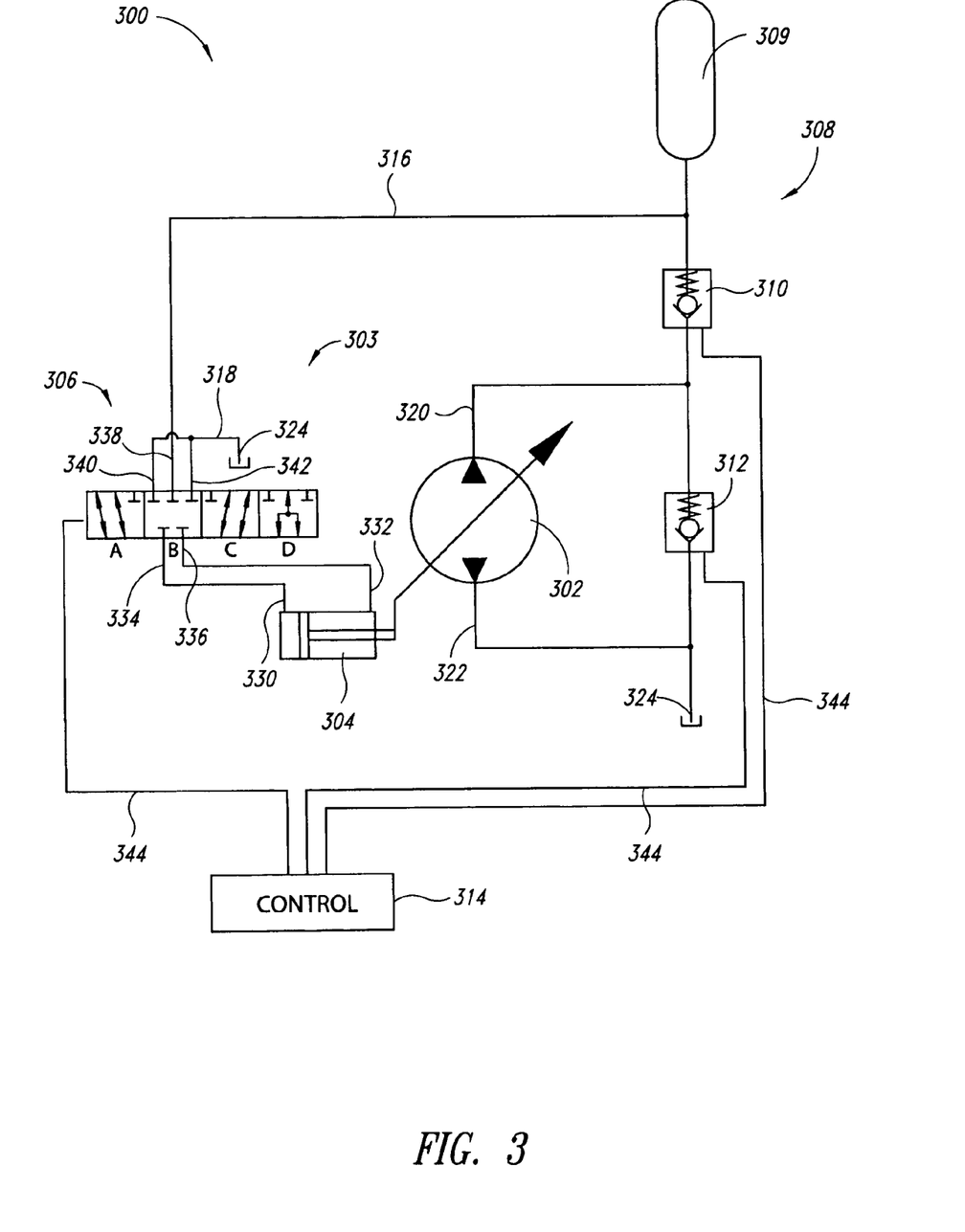
FIG. 3 shows a fluid power system schematic diagram according to an embodiment of the invention.

FIG. 3 is a schematic diagram of a fluid power system according to an embodiment of the invention. The system 300 includes an over-center pump/motor 302, a motor control network 303, and a power supply network 308. The motor control network 303 comprises an actuator 304 for controlling a stroke angle of the motor 302, a control valve 306 for control of the actuator 304, and a controller 314 for managing the network. Electrical signal lines 344 provide control signals from the controller 314 to various components of the power system 300. The power supply network 308 includes a high-pressure fluid supply 309, a low-pressure fluid supply 324, first and second check valves 310, 312, and fluid transmission lines 316, 318, 320, and 322. The high- and low-pressure fluid supplies 309, 324 may be accumulators configured to hold fluid at respective high and low pressures, or other sources such as are known in the art. A pressure differential between the high- and low-pressure fluid supplies 309, 324 is the source of motive power for both the motor 302 and the motor control network 303.

The actuator 304 is a double-action type actuator and includes first and second control ports 330, 332. When high-pressure fluid is supplied to the first control port 330 while low-pressure fluid is supplied to the second control port 332, a piston of the actuator extends therefrom, moving the stroke angle of the motor 302 in a positive direction. Conversely, when high-pressure fluid is supplied to the second control port 332 while low-pressure fluid is supplied to the first control port 330, the piston of the actuator retracts from the actuator, moving the stroke angle of the motor 302 in a negative direction. This arrangement is sometimes referred to as a push-pull configuration.

According to an embodiment of the invention, if pressurized fluid of substantially equal pressure is supplied to both control ports 330, 332 of the actuator 304, the piston is configured to travel to a specific position corresponding to the zero-angle position of the motor 302. Thus, if, in response to a system malfunction, high-pressure fluid is supplied to both control ports 330, 332, the actuator 304 will automatically stroke the motor 302 to a zero angle, zero-torque condition. In the case of a vehicle employing such a system, this would result in the vehicle losing power and being allowed to coast to a stop. The specific position of the actuator mentioned above may be referred to as its default position.

The valve 306 is a five-port, four-position valve configured to control operation of the actuator 304. A first input port 338 is coupled to the high-pressure fluid supply 309 via fluid transmission line 316, while second and third input ports 340, 342 are coupled to the low-pressure fluid supply 324 via transmission line 318. First and second output ports 334, 336 of the valve 306 are coupled to respective first and second control ports 330, 332 of the actuator 304. In the schematic shown, the valve positions of a switching member, such as a spool, are labeled A, B, C, and D. With the valve in position B as shown, the input and output ports of the valve 306 are closed. This results in the actuator 304 being hydraulically locked at whatever position it is in when the valve moves to its position B. This may be referred to as the neutral position of the valve, because there is no movement being commanded.

While in position A, the valve couples the first input port 338 to the second output port 336, while the second input port 340 is coupled to the first output port 334. In this position, high-pressure fluid is supplied to the second control port 332 while low-pressure fluid is supplied to the first control port 330. Accordingly, the piston of the actuator 304 will retract into the actuator 304, moving the stroke angle of the motor 302 in a negative direction.

When the valve is moved to the C position, the valve couples the first input port 338 to the first output port 334, while coupling the second input port 342 to the second output port 336. In this position, high-pressure fluid is supplied to the first control port 330 of the actuator 304 while low-pressure fluid is supplied to the second control port 332, and the piston of the actuator 304 is extended from the actuator, moving the stroke angle of the motor 302 in a positive direction.

In the valve position D, the first input port 338 is coupled to both the first and second output ports 334, 336, which supplies high-pressure fluid to both the first and second control ports 330, 332 of the actuator, causing the actuator to move to its default position and stroke the motor 302 to zero. The valve 306 is configured to move to position D anytime the valve loses control power. Thus, whether there is a general loss of control power to the vehicle, a specific loss of power to the valve alone, or the power is cut off by the controller in response to a fault or malfunction elsewhere in the system, the motor 302 will immediately stop powering the vehicle, rather than freezing at its present setting, or moving to an uncontrolled power condition.

The first and second check valves 310, 312 of the power supply network are configured to provide additional fail-safes. The first check valve 310 is configured to prevent flow of high-pressure fluid toward the motor 302 unless the controller 314 opens the valve 310. On the other hand, fluid flowing toward the high-pressure fluid supply 309, such as when the motor 302 is functioning as a pump, can freely pass through the valve 310. In normal operation, whenever the motor 302 is at a zero angle, the valve 310 is closed. Not only does this serve to help prevent uncommanded power conditions, but by removing high-pressure from the motor 302, tension applied on internal components is removed, allowing the motor to turn more freely, thereby improving the operational economy of the motor and reducing unnecessary wear. This is especially beneficial in a condition where the vehicle operator takes all pressure off the accelerator pedal while coasting, but without braking. When a command to move away from a zero angle is sent to the controller, i.e., when the operator again steps on the accelerator, the controller 314 opens the valve 310 prior to stroking the motor 302 to the commanded position. This sequence can be done very quickly, usually in a few hundred milliseconds, and does not substantially slow operation of the system. Under certain malfunction conditions, the controller 314 will automatically close the valve 310, removing high-pressure from the motor.

The second check valve 312 is positioned between fluid ports of the motor 302. A primary function of the second check valve 312 is to prevent damage to the motor 302 in the event high-pressure fluid is shut off while the motor is rotating. For example, in a case where the motor 302 is coupled to the drive-train of a vehicle, and the vehicle is in motion, if high-pressure fluid supply is suddenly cut off, continuing rotation of the motor 302, due to the forward motion of the vehicle, will cause the motor to attempt to draw fluid from the high-pressure side of the motor. If it cannot draw any fluid, the motor will cavitate, which may damage the motor. Such a situation may also cause the motor to attempt to freeze the wheels, as though the brakes had been suddenly and forcefully applied. To prevent such a situation, the second check valve 312 will allow low-pressure fluid to be drawn from the low-pressure fluid source 324 into the high-pressure side of the motor 302, and the motor 302 will be allowed to coast easily until rotation stops. However, if the controller 314 detects an uncontrolled power situation, such as, for example, if the stroke angle fails to change in response to a command, the controller is configured to close valve 310 and open the valve 312, creating a low pressure loop between the fluid ports of the motor 302 and depriving it of motive power.

In a case where the motor 302 is braking the vehicle, the motor is stroked to some negative stroke angle according to the amount of pressure applied to the brake pedal by the driver. At the same time, valve 310 may be closed. Because the motor 302 is at a negative angle, and the vehicle is traveling forward, the motor 302 will operate as a pump, drawing low-pressure fluid from the low-pressure fluid supply 324 and forcing it past the valve 310 (acting now as a check-valve if the valve is closed) to the high-pressure fluid supply 309. As the vehicle slows, the motor 302 is gradually stroked toward zero, and eventually the friction brakes of the vehicle complete the braking. However, if, during the braking, it becomes necessary to remove the braking torque of the motor 302 independent of the stroke angle, the valve 312 is opened, which creates a low-pressure loop between the fluid ports of the motor 302 as described above.

It may be seen that several different means are provided to permit motive power to be instantly removed from the motor 302 in the event of a malfunction, providing a degree of redundancy that drastically reduces the likelihood of a malfunction resulting in a runaway motor condition.

According to an embodiment of the invention, methods are provided for operation of a vehicle employing the system 300 described with reference to FIG. 3. For example, when starting the vehicle, i.e., when the key is turned on, electric power is first provided to the control valve 306 and the valve is commanded to bring the stroke angle of the motor 302 to zero. The valve 310 is only opened after the motor 302 is confirmed to be at a zero angle. The operator can then proceed to operate the vehicle in a normal manner.

When the key is turned off to shut-down the vehicle, the motor 302 is first confirmed to be at zero displacement, or commanded to zero if necessary; the control valve 306 is moved to neutral; the high-pressure valve 310 is closed and a source valve (not shown) at the high-pressure accumulator is closed; then power to the control valve is shut off, which will result in the control valve moving to the default position. If the control valve 306 is configured such that it moves through another valve position between the neutral and default setting, it may be desirable to provide a pressure bleed valve in the high-pressure line 316 to vent pressure before cutting power to the valve 306; otherwise, as the valve passes through the other setting, the residual high pressure in the line may cause the actuator 304 to pulse, which would be perceptible to an occupant.

Actuators will be described hereafter according to various embodiments. The term inward will be used to refer to features, surfaces, or movement toward a closed end of an actuator, while outward will be used to refer to features, surfaces, or movement toward an end of an actuator from which a piston rod extends.

Figure 4A:
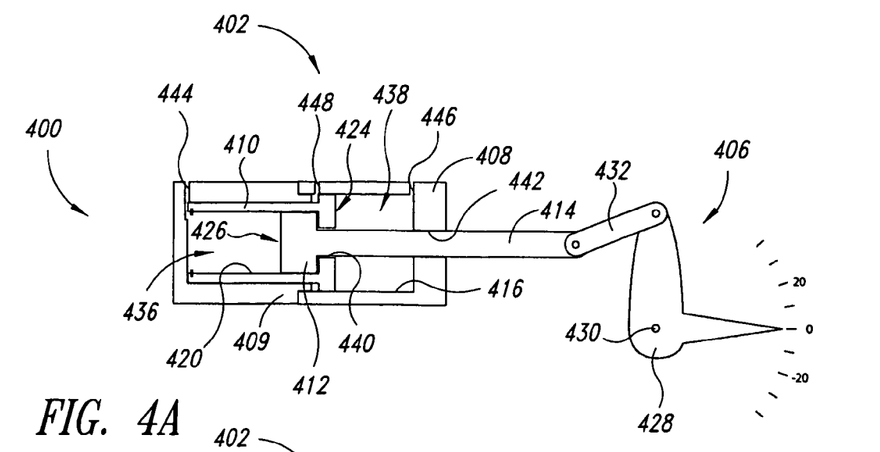
FIGS. 4A-4C show, diagrammatically, a fluid-powered actuator according to an embodiment of the invention, in various configurations.
Figure 4B:
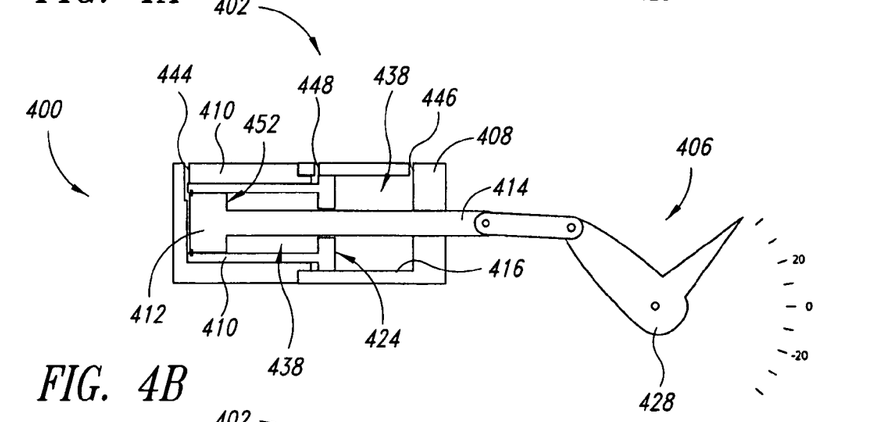
Figure 4C:
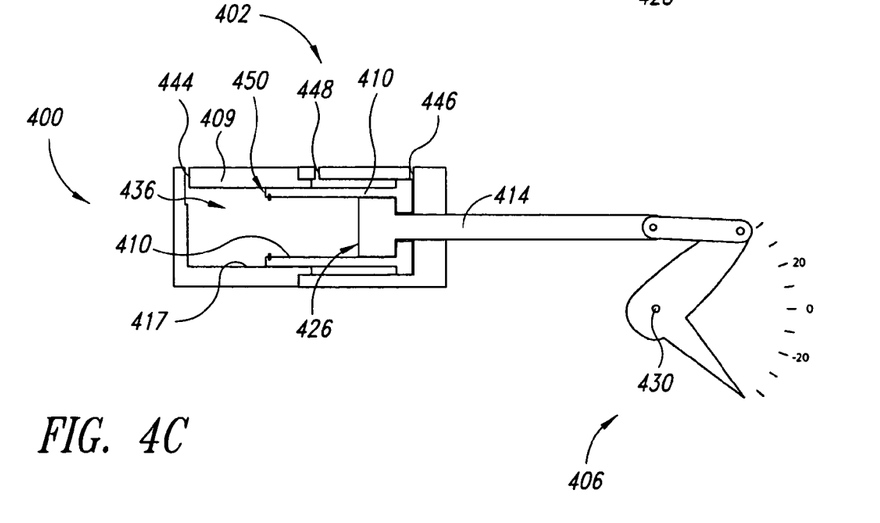

Referring now to FIGS. 4A-4C, a push-pull actuator system 400 is described, according to an embodiment of the invention. The system 400 includes an actuator 402 and a controlled mechanism 406. The controlled mechanism 406 is shown, solely for ease of illustration, as a simple pointer 428 configured to rotate about a pivot point 430 while indicating a relative angle of position on a scale. It will be recognized that the controlled mechanism represents any type of mechanism that might be comprised in a system also employing the actuator 402. For example, the fluid power system 300 described with reference to FIG. 3 employs a push-pull type actuator to control the stroke angle of a motor 302, so the controlled mechanism may be a device such as the motor 302 of FIG. 3. Alternative embodiments may include other devices or systems that require rotation or translation, such as, for example, hydraulically powered excavation equipment, robotic systems, etc.

The actuator 402 includes first and second outer cylinder segments 408, 409, an inner cylinder 410, and a piston 414. The piston 414 includes an integral output shaft that is coupled via a linkage 432 to the pointer 428 such that linear movement of the piston 414 is converted to rotational movement of the pointer 428, as indicated on the scale.

The first and second cylinder segments 408, 409 have respective first and second cylinder bores 416, 417 that are coaxial with respect to each other. The diameter of the first bore 416 is greater than that of the second bore 417. The inner cylinder 410 is slideably positioned within the actuator 402 such that a portion of the inner cylinder 410 lies within the first outer cylinder bore 416 while another portion lies within the second outer cylinder bore 417. Seals are positioned between the inner cylinder 410 and the first outer cylinder bore 416, and between the inner cylinder 410 and the second outer cylinder bore 417. The seals are not shown, but may be ring seals of various known types, or may simply comprise a closely fitted engagement between the relative parts. Such arrangements are well known in the art and are not shown to avoid unnecessary complication of the figures. The inner cylinder 410 comprises first and second working surfaces 450, 424 against which fluid pressure acts to move the inner cylinder 410 axially within the actuator 402.

The piston 414 is positioned within the actuator 402 such that the piston head 412 is positioned within the inner cylinder 410 and is sealingly engaged with the bore 420 of the inner cylinder 410. The shaft of the piston passes outward through an unsealed aperture 440 in the inner cylinder and through a sealed aperture 442 in the first outer cylinder bore 416. The piston 414 includes first and second working surfaces 426, 452 against which fluid pressure acts to move the piston 412 axially within the inner cylinder 410. A first fluid chamber 436 is defined, in part, by the first working surface 426 of the piston 412 and is pressurized via a first control port 444. Fluid pressure applied at the first control port 444 bears against the first working surface 426 of the piston head 412, as well as the first working surface 450 of the inner cylinder 410. A second fluid chamber 438 is defined, in part, by the second working surface 452 of the piston head 412 and includes the portion of the bore 420 of the inner cylinder 410 that is to the right of the piston head 412, as viewed in FIGS. 4A-4C. The second fluid chamber is pressurized via a second control port 446. Fluid pressure applied at the second control port 446 bears against the second working surface 452 of the piston head 412 via the unsealed aperture 440, as well as the second working surface 424 of the inner cylinder 410. A fluid port 448 is vented to low pressure to allow free movement of the inner cylinder 410.

In operation, when high-pressure fluid is supplied to first control port 444 while low-pressure fluid is supplied to second control port 446, the high-pressure fluid, acting on the first working surface 426 of the piston head 412, drives the piston outward toward the position shown in FIG. 4C. On the other hand, when high-pressure fluid is supplied to second control port 446 while low-pressure fluid is supplied to first control port 444, the high-pressure fluid, acting on the second working surface 452 of the piston head 412, drives the piston 414 inward toward the position shown in FIG. 4B. The inner cylinder 410 also moves in response to fluid pressure acting on first and second working surfaces 450, 424, but this does not normally influence the position of the piston 414, since the piston will be moving in the same direction.

In the event an equally pressurized fluid is supplied at the first and second control ports 444, 446, the piston will move to the default position shown in FIG. 4A, as described hereafter. As in a typical double acting actuator with a single output shaft, placing an equal pressure on both sides of the piston 414 will cause the piston to tend to move to its maximum outward position because the surface area of the second working surface 452 is less than that of the first working surface 426 due to the presence of the shaft. At the same time, the net surface area of the second working surface 424 of the inner cylinder 410 is greater than that of the first working surface 450, which causes the inner cylinder 410 to move as far as possible to the left, given its shape and length. Movement of the piston head 412 beyond the default position brings the second working surface 452 into contact with the inner cylinder 410, such that movement beyond this point requires that the inner cylinder 410 move outward, as well.

However, the surface areas of the various working surfaces are selected such that the total surface area of the second working surface 424 of the inner cylinder 410 exceeds the surface area of the sum of the outer working surface 426 of the piston 412 and the outer working surface 450 of the inner cylinder 410. As a result of this difference in area, the net outward force against the piston head 412 is insufficient to move the inner cylinder 410 away from its default position shown in FIG. 4A. On the other hand, the inner cylinder cannot move any further inward, due to the stepped relationship of the first and second bores 416, 417, and/or contact of the inner cylinder 410 with an end surface of the second bore 417.

Figure 5:
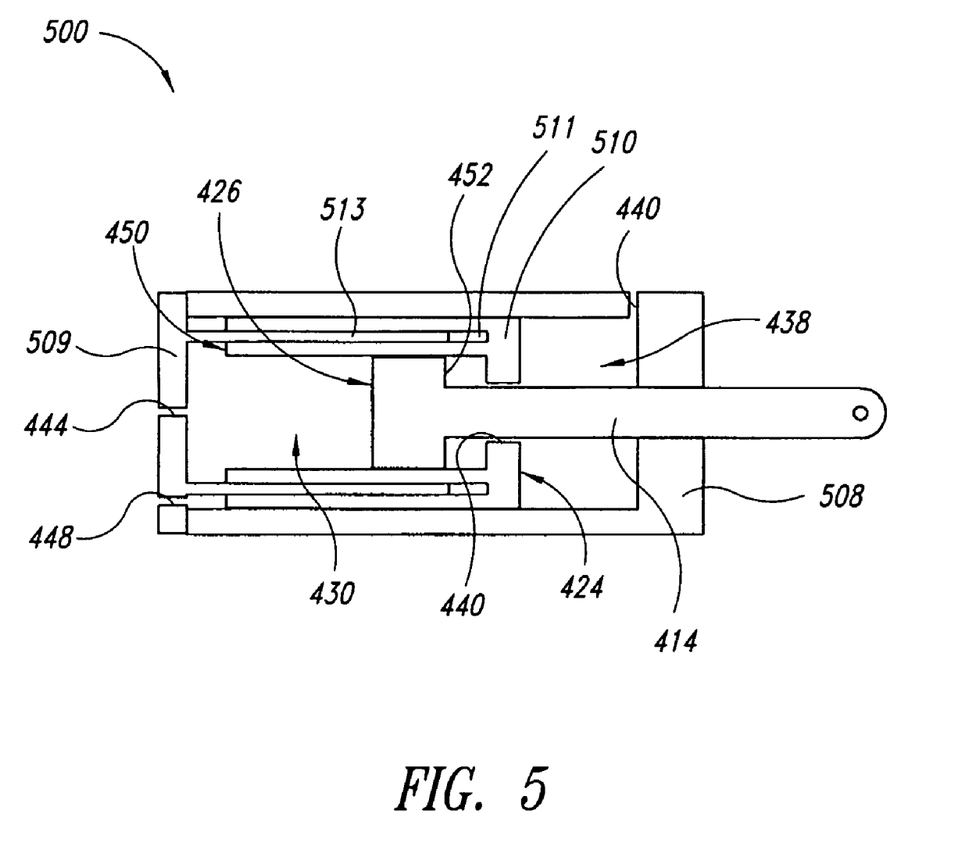
FIG. 5 shows a fluid-powered actuator according to an alternate embodiment of the invention.

FIG. 5 shows a push-pull type actuator 500 according to another embodiment of the invention. The actuator 500 shares many structural similarities with the actuator 400 of FIGS. 4A-4C. Accordingly, only the features of the actuator 500 that differ from those of the actuator 400 will be described in detail. Identical reference numbers indicate structures of such similarity as to require little or no additional description.

The actuator 500 includes first and second outer cylinder segments 508, 509, and an inner cylinder 510 that has an annular channel 511 that receives a cylindrical insert 513 that is integral with the second outer cylinder segment 509. The second outer cylinder segment 509 also includes a low-pressure fluid port 448 to permit free movement of the inner cylinder 510 within the actuator 500. A piston 414 is positioned within the inner cylinder 510. Operation of the actuator 500 is substantially identical to that of the actuator 400 described with reference to FIGS. 4A-4C.

Figure 6A:
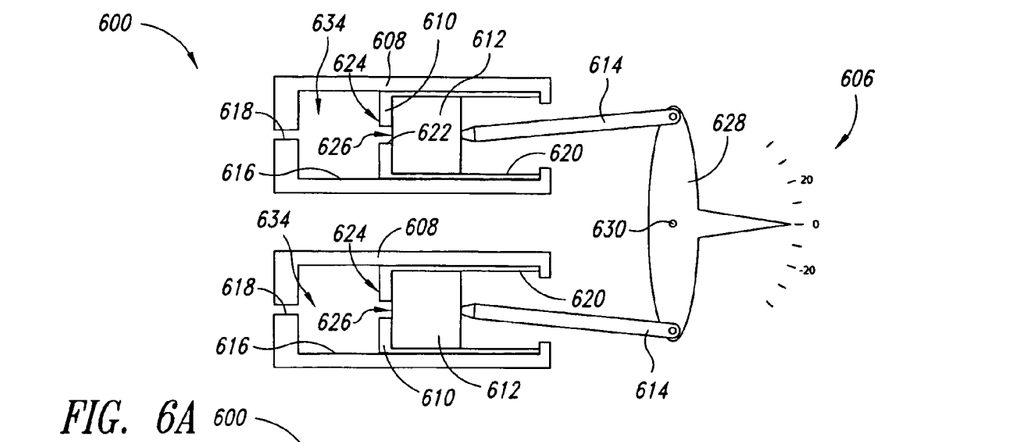
FIGS. 6A-6C show, diagrammatically, a fluid-powered actuator according to a further embodiment of the invention, in various configurations.
Figure 6B:
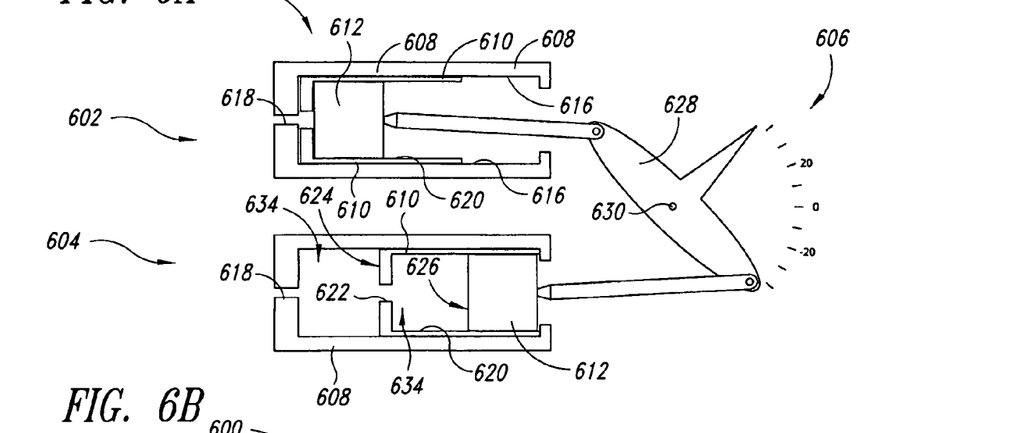
Figure 6C:
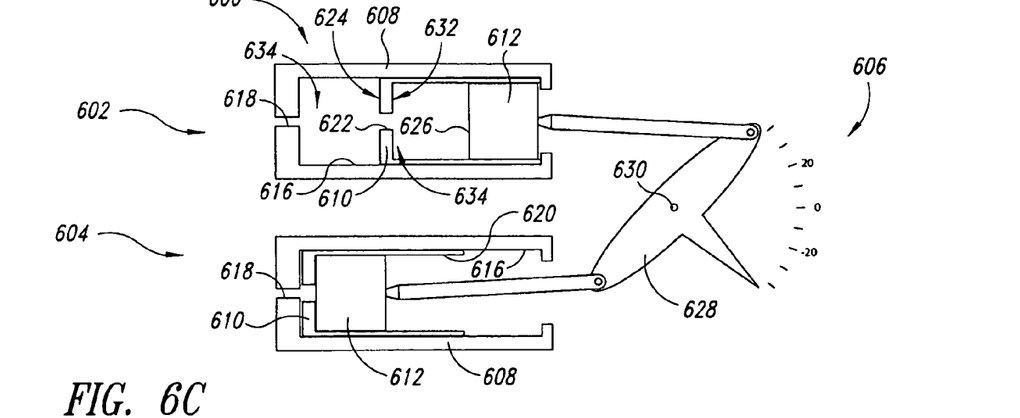

FIGS. 6A-6C illustrate a push-push type actuation system 600 that employs first and second single-acting actuators 602, 604 coupled reciprocally to a controlled mechanism 606 such that inward movement of the first actuator 602 corresponds to outward movement of the second actuator 604. The controlled mechanism 606 is similar to the mechanism 406 described with reference to FIGS. 4A-4C, and, for the purpose of illustration, includes a pointer 628 configured to rotate about an axis point 630, but can include any controlled mechanism that is controlled to change angle. Each actuator includes an outer cylinder bore 616 formed in an outer cylinder 608, an inner cylinder 610 positioned therein and having an inner cylinder bore 620, and a piston 612 positioned within the inner bore 620 and coupled to the controlled mechanism by a piston rod 614. The piston 612 includes a single working surface 626, while the inner cylinder includes a single working surface 624 and an aperture 622 through which fluid acts on the working surface 626 of the piston 612.

In a push-push system such as that shown here, each actuator 602, 604 is provided with a single control port 618. During normal operating conditions, one of the actuators 602, 604 is provided with high-pressure fluid at its control port 618, while the other is provided with low-pressure fluid. This is illustrated, for example, in FIG. 6B, where the second actuator 604 is provided with high-pressure fluid while the first actuator 602 is provided with low-pressure fluid. As a result, the piston 612 of the second actuator is driven outward against the controlled mechanism 606, causing it to rotate counter-clockwise about the pivot point 630, moving the pointer 628 to a positive angle, and pushing the piston 612 of the first actuator 602 inward. Conversely, as pictured in FIG. 6C, if the polarity of the fluid supplied to the respective actuators is reversed, the movement of the respective pistons and of the pointer is also reversed.

When the first and second actuators 602, 604 are supplied with an equally pressurized fluid, the actuators will each move to their respective default positions, as shown in FIG. 6A, and the pointer will be rotated to the zero angle. This is because the cross-sectional area of the outer bore 616 is greater than that of the inner bore 620, and thus the net collective surface area of the working surface 626 of the piston 612 and the working surface 624 of the inner cylinder 610 is greater than the area of the working surface 626 of the piston 612, alone. Movement of the piston 612 while it is inward of the default position is driven by fluid pressure acting on both the piston surface 626 and the inner cylinder surface 624, while movement of the piston outward of the default position is driven by fluid pressure on the working surface 626 of the piston, alone. In order for one piston to move outward beyond the default position, it must have sufficient force to move the piston and inner cylinder of the opposite actuator inward from the default position. This is possible while one actuator is provided with high-pressure fluid and the other with low-pressure fluid, but if the fluid pressure of the two actuators 602, 604 is equal, neither piston will be able to move inward beyond the default position.

According to an embodiment of the invention, a fluid power system, similar to that described with reference to FIG. 3, employs, in place of the actuator 304 described above, a push-push type actuation system such as, for example, that described with reference to FIGS. 6A-6C.

In FIGS. 6A-6C, the actuators 602 and 604 are shown in a configuration in which axes of movement of the respective pistons 612 are parallel with respect to each other, and thus are at a common angle. According to other embodiments, the actuators may be arranged at other angles of between 0° and 180° with respect to each other, as required by the particular application. For example, a bent-axis pump/motor having a rack and pinion angle control mechanism is disclosed in U.S. Pat. No. 7,014,429, incorporated herein by reference, in its entirety. In such a system, actuators such as actuators 602, 604 of FIG. 6 may be arranged at 180° with respect to each other, and along a common axis, with respective piston rods 614 extending toward each other and coupled at respective ends of the rack to control the stroke angle of the motor.

With respect to push-push type actuator systems, the embodiment described and illustrated is shown as being symmetrical; namely, the actuators 602, 604 are identical in size, and the pivot point 630 of the controlled mechanism is centered between the connection points of the respective piston rods 614. In a system in which the pivot point is not centered, it will be understood that the longer lever-arm of one side will give a strength advantage to the actuator on that side, while giving a reach advantage to the actuator on the opposite side. Accordingly, the relative dimensions of the actuators 602, 604 can be selected to provide one actuator with greater power and the other actuator with a longer reach, to compensate for the unequal coupling.

According to another embodiment of the invention, a push-push actuation system includes a first actuator such as one of the actuators 602, 604 described with reference to FIGS. 6A-6C, and a second actuator of a more conventional type known in the art, having, for example, a single cylinder bore. The net working surface of the second actuator is selected to be less than the net collective surface area of the working surfaces of the first actuator, but greater than the net working surface of the piston positioned within the inner bore of the first actuator, such that, during normal operation, while one of the actuators is provided with high-pressure fluid at its control port while the other is provided with low-pressure fluid, the system operates substantially as described with reference to FIGS. 6B and 6C, and when the first and second actuators are supplied with an equally pressurized fluid, the first actuator will move to its default position, as shown in FIG. 6A, driving the second actuator to an equivalent position.

In actuator embodiments described above, the default position has been shown and described as the midpoint of travel of the respective actuator piston. It will be recognized that this is a design feature, and that the default position can be selected to be at any point in the travel of the actuator or actuators.

Movement to the default position has been described as occurring in response to an equal fluid pressure at each of two fluid ports, i.e., the two ports 444, 446 of the push-pull actuators, or the ports 618 of each of the actuators 602, 604 in the push-push configuration. Meanwhile, the system of FIG. 3 has been described as providing high-pressure fluid to both ports of the actuator 304 employed in that system, which will result in a very fast response, as compared to a substantially lower fluid pressure. Nevertheless, it will be understood that, while it is not essential that the fluid pressure applied to both ports be equal to the high-pressure fluid of the system, it must be sufficiently greater than ambient pressure to compel the actuator(s) to move. Accordingly, where the claims recite a limitation that is predicated on the presence of equal fluid pressure at two fluid ports, this is to be understood as meaning an equal fluid pressure sufficiently greater than ambient pressure to compel the recited structure to perform as claimed. The determination of the actual value of the minimum pressure is within the abilities of one of ordinary skill in the art.

The term net surface area, as used in the specification, is used to mean the difference in areas of opposing surfaces of a given element that are subject to fluid pressure from a common body of fluid. For example, referring to FIG. 6C, the inner cylinder 610 of the first actuator 602 has a working surface 624 and an opposing surface 632, both of which are subject to pressure from the fluid chamber 634. The opposing surface has a smaller surface area due to the side-wall of the cylinder 610. Thus, the net surface area of the working surface 624 is the area of the working surface 624, minus the area of the opposing surface 632. Where claims refer to the surface area of a working surface, this is to be construed as the net surface area thereof.

Referring now to FIGS. 7A-7D, a control valve 700 is shown, according to an embodiment of the invention. The valve 700 includes a valve body 702, a valve spool 704, a return spring 706, and a control solenoid 708. The valve body 702 includes first, second, and third input ports 710, 712, and 714, and first and second output ports 716, 718, and a valve bore 720. The valve spool 704 is positioned within the valve bore 720, and includes first, second, and third sealing lands 722, 724, 726. The return spring 706 is arranged to apply a bias against the valve spool 704 toward the left, as viewed in the figures. The solenoid 708 is configured to draw the valve spool 704 toward the right, against the bias of the spring 706, in relation to a level of electric current flowing through the solenoid. Power to the solenoid may be controlled by varying a voltage level applied thereto, or may be controlled with a substantially constant voltage switched on and off according to a selected duty cycle, and in which the duty cycle is varied to modify the strength of the attractive force of the solenoid.

Figure 7A:
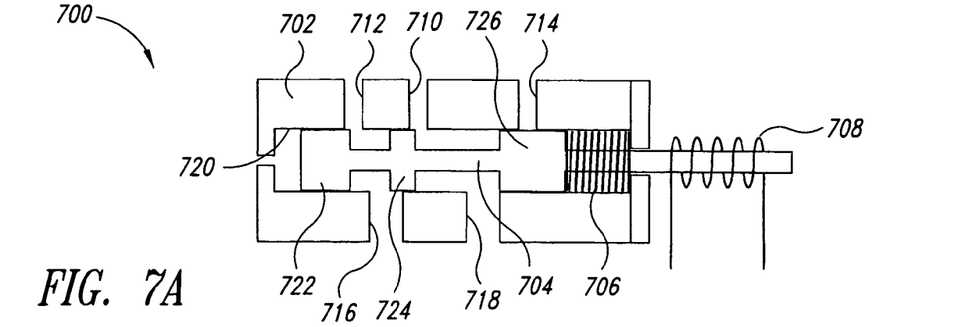
FIGS. 7A-7D diagrammatically illustrate a control valve according to an embodiment of the invention.
Figure 7B:
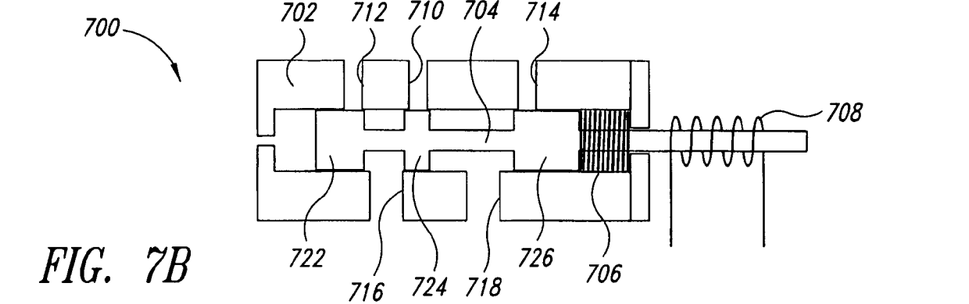

FIG. 7B shows the spool 704 in a neutral position such as that described with reference to position B of the valve 306 of FIG. 3. In this position, the second land 724 closes the first input port 710, while the first and third lands close the second 712 and third 714 input ports, respectively. The first and second output ports 716, 718 are effectively closed as well, since they are isolated from communication with any other port. In this valve position, any device controlled by the valve 700 will be hydraulically locked, at least insofar as the control valve 700 is concerned.

FIG. 7A shows the spool 704 having moved to the left of the position described with reference to position B of the valve 306 of FIG. 3, in a position that corresponds to the position A. In this position, the first input port 710 is placed in fluid communication with the second output port 718, while the second input port 712 is placed in fluid communication with the first output port 716. The third input port 714 is closed.

Figure 7C:
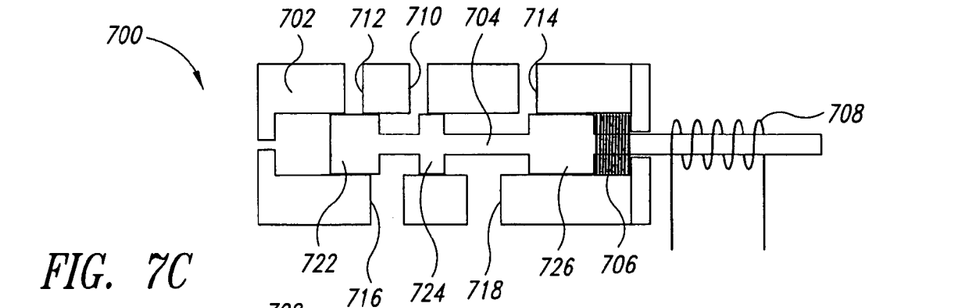

FIG. 7C shows the spool 704 having moved to the right of the position described with reference to position B, in a position that corresponds to the position C of the valve 306 described with reference to FIG. 3. In this position, the first input port 710 is placed in fluid communication with the first output port 716, while the third input port 714 is placed in fluid communication with the second output port 718. The second input port 712 is closed.

Figure 7D:
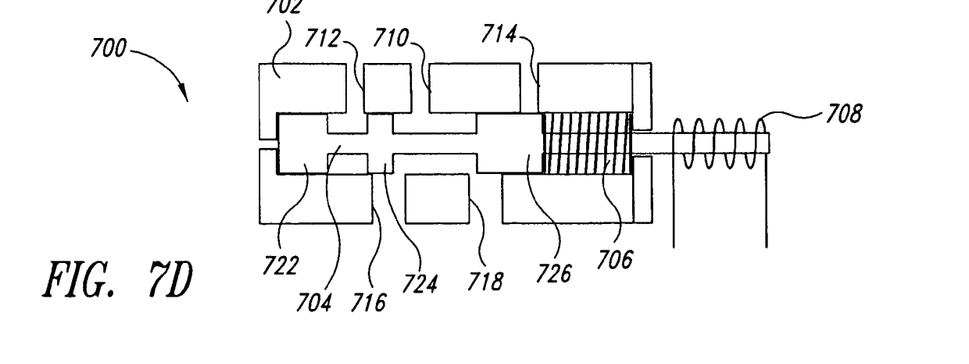

Referring now to FIG. 7D, the valve 700 is shown with the spool 704 in the default position corresponding to the position D of the valve 306 described with reference to FIG. 3. In this position, the first input port 710 is placed in fluid communication with both the first and second output ports 716, 718, while the second and third input ports 712, 714 are closed.

If the solenoid 708 loses power, the spring 706 drives the spool 704 to the extreme left, as shown in FIG. 7D. Such a loss of power may be in response to the intentional powering down of a system employing the valve 700, or it may be in response to some malfunction of the system, such as a failure of a controller, a short or break in a power supply to the solenoid, or an intentional cutting of power by the controller in response to some other system malfunction.

Figure 8A:
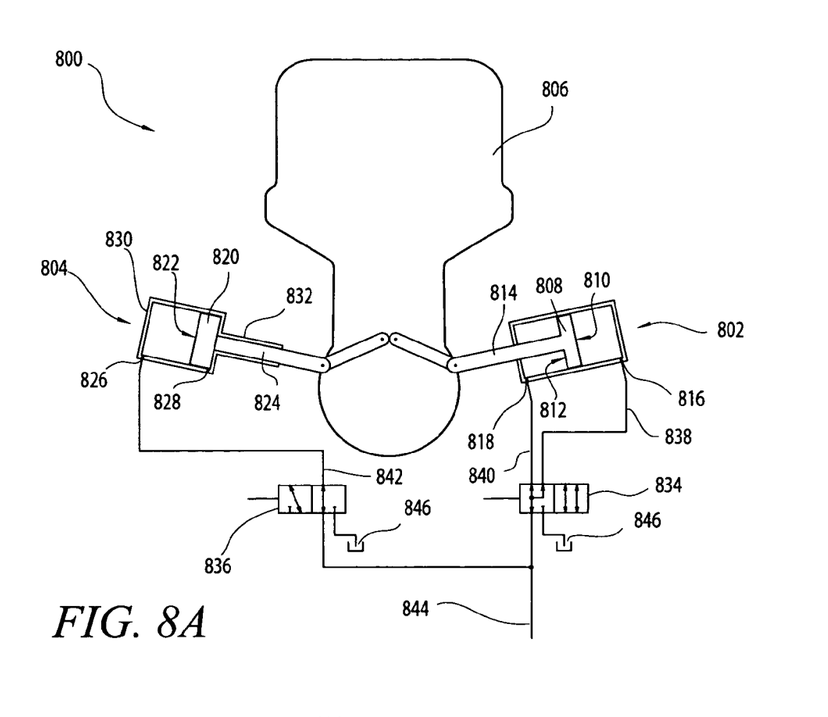
FIGS. 8A-8C show, diagrammatically, a fluid-powered actuation system according to an embodiment of the invention, in various configurations.
Figure 8B:
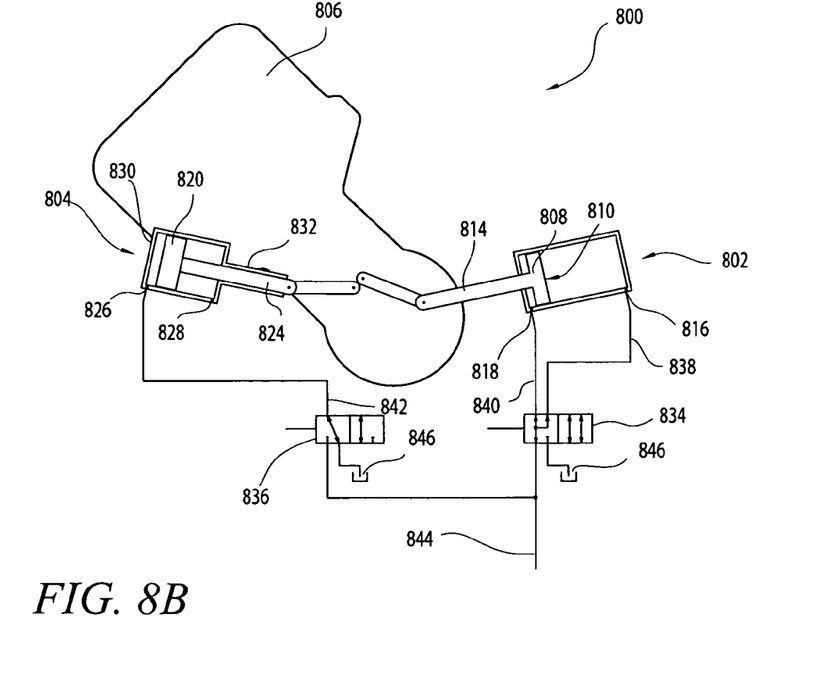
Figure 8C:
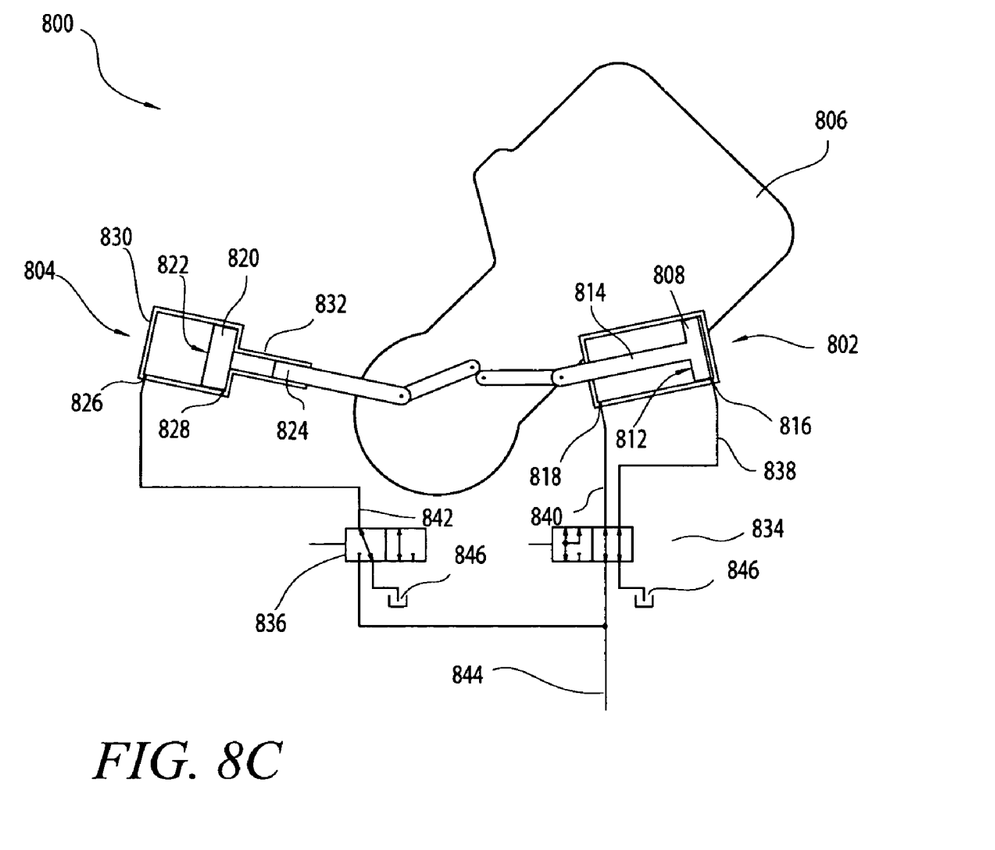

FIGS. 8A-8C show an actuator system 800 according to another embodiment of the invention. The system 800 includes first and second actuators 802, 804 coupled to a yoke 806 of an over-center motor such as motor 100 described with reference to FIGS. 1A-2C. The first and second actuators 802, 804 are shown angled downward at an angle of about 155° relative to each other, and coupled to the yoke 806 via respective linkages so as to control the stroke angle of the motor. The configuration shown is merely exemplary. According to various embodiments, the actuators may be coupled at any angle relative to each other and to the yoke, and may be coupled via linkages as shown, or by any other appropriate means, including for example, a rack and pinion arrangement as mentioned above with reference to FIGS. 6A-6C.

First actuator 802 is a conventional push-pull type actuator with a piston 808 having a large working surface 810, a small working surface 812, and a piston rod 814. First actuator 802 also includes first and second control ports 816, 818 by which the fluid pressure is applied to the large and small working surfaces, respectively.

Second actuator 804 includes a floating piston 820 having a working surface 822, and a separate piston rod 824. Second actuator 804 also includes third and fourth control ports 826, 828 by which the actuator 804 is controlled. A casing 830 of the second actuator 804 includes a sleeve 832 within which the separate piston rod 824 moves.

First and second control valves 834, 836 are coupled to control operation of the first and second actuators 802, 804, respectively, via fluid lines 838, 840, and 842. First control valve 834 may be a conventional push-pull motor actuation control valve such as is known in the art. Another valve that may be used to control the first actuator 802 is described in U.S. patent application Ser. No. 10/767,547, incorporated herein by reference, in its entirety.

High- and low-pressure fluid is supplied to the valve 834 via supply lines 844, 846, respectively. In a first position, as shown in FIGS. 8A and 8B, the first control valve 834 places both control ports 816, 818 in fluid communication with the high-pressure fluid supply. Force exerted by fluid pressure against the larger area of the large working surface 810 is greater than that exerted against the small working surface 812, which causes the piston 808 to move to the left, as oriented in the figures. This will tend to drive the yoke to left, as well, as shown in FIG. 8B.

In a second position, as shown in FIG. 8C, the first control valve 834 places the first control port 816 in fluid communication with the low-pressure fluid supply, while the second control port 818 remains in fluid communication with the high-pressure fluid supply. The force exerted by high-pressure fluid against the small working surface 812 is greater than the force exerted by the low-pressure fluid against the large working surface 810, which causes the piston 808 to move to the right, causing the yoke to rotate right, as well, as shown in FIG. 8C.

The second control valve 836 is configured to place the third control port 826 in fluid communication with either the high- or low-pressure fluid supply when in a first or second position, respectively. The fourth control port 828 is coupled to a low-pressure source, preferably lower than the pressure of the low-pressure fluid supply. Alternatively, the fourth control port 828 may be pressurized at ambient pressure.

While the third control port 826 is in fluid communication with the low-pressure fluid supply, as shown in FIGS. 8B and 8C, the stroke angle of the yoke 806 is controlled by the operation of the first control valve 834: while high-pressure fluid is supplied to the large working surface side of piston 808, the yoke 806 is driven to the left, as shown in FIG. 8B, and while low-pressure fluid is supplied to the large working surface side of piston 808, the yoke 806 is driven to the right, as shown in FIG. 8C. When the yoke 806 is rotated to the left, as shown in FIG. 8B, the separate piston rod 824 bears against the floating piston 820, driving it to the left within the actuator casing 830. The floating piston 820 has a shorter range of operation than the piston 808 of the first actuator 802. Thus, when the yoke 806 is rotated to the right, as shown in FIG. 8C, the floating piston 820 moves to the right-most limit of its range of motion, then stops, while the separate piston rod continues moving within the casing sleeve 832, as shown in FIG. 8C.

First and second control valves 834, 836 are each configured to move to their respective first positions when power is removed from the valves, such as in response to a spring bias similar to that described with reference to FIGS. 7A-7C. Both control valves are powered from the same source. During normal operation of the system 800, the second control valve is continuously maintained at its second position such that the first control valve can control the yoke angle in a normal manner. However, if, for some reason, power is lost to the control valves, both move to their respective first positions. The area of the working surface 822 of the floating piston 820 is selected to be sufficient to drive the first actuator piston 808 to the right, even while first control port 816 is at high-pressure. Thus, the piston 820 moves to the right-most limit of its range of motion. This places the yoke 806 at its zero stroke angle position, as shown in FIG. 8A.

It will be recognized that the surface area of the working surface 822 of the floating piston 820 need only be sufficient to compensate for the difference in areas of the large and small working surfaces 810, 812, plus provide sufficient force to rotate the yoke 806. However, the surface area may be selected so as to be sufficient to move the yoke 806 against the first actuator 802 even while the second control port 818 is at low-pressure or depressurized.

Various embodiments have been disclosed in the context of a fail-safe network for a fluid power system of a hydraulic hybrid vehicle. The scope of the invention is not limited to systems that employ all the disclosed components, or to vehicle systems in general.

Where the term move to, or a related term such as moves to, or moving to, is used in the claims, the term is defined as meaning move to, and no farther. For example, if a claim recites that "in the absence of a control bias from the control mechanism, the switching member moves to the fourth position," this means that, under the recited conditions, the switching member moves to the fourth position, and no farther, and thus remains at the fourth position as long as the recited conditions continue.

The term selective and related terms, such as, e.g., selectable, are used in the claims to refer to a condition (or configuration) of a recited element that is one of a plurality of mutually exclusive conditions, in which a choice of the recited condition over the others is made according to criteria that are independent of circumstances immediately surrounding the element to which the term is applied. For example, if a claim recites, "the check valve including a pilot control permitting selective opening of the valve," this means that, of the plurality of mutually exclusive conditions to which the valve is subject (e.g., opening and closing, which cannot occur simultaneously), opening of the valve is not directly dependent on or controlled by circumstances immediately surrounding the valve itself, but by an independent control, such as, e.g., a control circuit or user operation. Examples of such operation include the check valves 310 and 312 described above with reference to FIG. 3, which are selectively controlled by the controller 314 according to criteria that include a variety of malfunctions of the related fluid system, in which the malfunctions do not arise from or directly affect the operation of the check valves.

Examples of hydraulic hybrid vehicles and their operation are described in a number of references, including U.S. Pat. No. 5,495,912; and U.S. patent application Ser. Nos. 10/386,029; 10/672,732; and 10/769,459.

The abstract of the present disclosure is provided as a brief outline of some of the principles of the invention, according to one embodiment, and is not intended as a complete or definitive description of any embodiment thereof, nor should it be relied upon to define terms used in the specification or claims. The abstract does not limit the scope of the claims.

Ordinal numbers are used in the specification and claims to distinguish between elements so referenced. There is no necessary significance to the value of a number assigned to one element with respect to other numbered elements. Furthermore, an ordinal number used to refer to an element in the claims does not necessarily correlate to a number used to refer to an element in the specification on which the claim reads.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A fluid system, comprising:
    an over-center fluid operated motor having a first motor port for high-pressure fluid supply and a second motor port for low-pressure fluid supply; and
    an actuation system, including first and second fluid control ports, coupled to the motor and configured to control changes in displacement of the motor, the actuation system being arranged to change the displacement of the motor in a first direction relative to a zero displacement position, up to a maximum displacement angle, when a high fluid pressure is present at the first control port, and to change the displacement of the motor in a second direction relative to the zero displacement position, up to a maximum displacement angle, when a low fluid pressure is present at the first control port, the actuation system being further configured to change the displacement of the motor to the zero displacement position when an equal fluid pressure is present at each of the first and second fluid control ports; and
    a control valve having first and second output ports in fluid communication with the first and second fluid control ports, respectively, the control valve configured to close the first and second output ports while in a first valve position; to place, while in a second valve position, the first output port in fluid communication with a high-pressure fluid source and the second output port in fluid communication with a low-pressure fluid source; to place, while in a third valve position, the first output port in fluid communication with the low-pressure fluid source and the second output port in fluid communication with the high-pressure fluid source; and to place, while in a fourth valve position, the first and second output ports in fluid communication with the high-pressure fluid source.

2. The fluid system of claim 1 wherein the actuation system is configured to change the displacement of the motor in the first direction when a higher fluid pressure is present at the first fluid control port relative to a fluid pressure present at the second fluid control port, and to change the displacement of the motor in the second direction when a higher fluid pressure is present at the second fluid control port relative to a fluid pressure present at the first fluid control port, the actuation system further configured to change the displacement of the motor to the zero displacement position when an equal fluid pressure is present at each of the first and second fluid control ports.

3. The fluid system of claim 1, further comprising a check valve coupled between the first and second motor ports of the motor such that passage of fluid through the check valve from the first motor port to the second motor port is checked, while passage of fluid through the check valve from the second motor port to the first motor port is enabled, the check valve including a pilot control permitting selective opening of the check valve such that, when opened, passage of fluid through the check valve from the first motor port to the second motor port is enabled.

4. The fluid system of claim 1 wherein the actuation system comprises a first, push-pull type actuator.

5. The fluid system of claim 4 wherein:
    the first actuator includes the first fluid control port and a third fluid control port, the first actuator configured to apply a displacement bias to the motor toward the first direction while fluid pressure at the first fluid control port is equal to or greater than a fluid pressure at the third fluid control port, and to apply a displacement bias to the motor toward the second direction while fluid pressure at the first fluid control port is less than the fluid pressure at the third fluid control port; and
    a second actuator configured to apply a displacement bias to the motor toward the second direction only as far as the zero displacement position, when fluid pressure is present at the second control port.

6. The fluid system of claim 5 wherein the actuation system is configured to change the displacement of the motor to the zero displacement position when the fluid pressure present at each of the first and second fluid control ports is equal to or greater than the fluid pressure at the third fluid control port.

7. The fluid system of claim 1 wherein the actuation system comprises a push-push type system having first and second actuators.

8. The fluid system of claim 1 wherein the control valve comprises a valve spring configured to bias the valve toward the fourth valve position, and a solenoid configured to bias the valve away from the fourth valve position with a bias level that is selectable by control of a level of electrical current in the solenoid, such that, in the absence of an electric current, the valve spring moves the valve to the fourth valve position.

9. A fluid actuator mechanism, comprising:
    a first fluid actuator having an output shaft movable between first and second output positions, the first fluid actuator including:
        a first cylinder having a first cylinder bore,
        a second cylinder positioned within the first cylinder bore and translatable between first and second positions relative to the first cylinder, and having a second cylinder bore, and
        a piston positioned within the second cylinder bore and translatable between third and fourth positions relative to the second cylinder, the piston being coupled to the output shaft, the first fluid actuator configured such that when the second cylinder is at the first position and the piston is at the fourth position, the output shaft is at a third output position located between the first and second output positions but not at either the first output position or the second output position; and
    first and second control ports, and wherein, when an equal fluid pressure is present at each of the first and second control ports, the second cylinder is compelled to move to and stop at the first position and the piston is compelled to move to and stop at the fourth position.

10. The fluid actuator mechanism of claim 9 wherein the first cylinder bore comprises first and second bore regions, the first bore region having a diameter greater than a diameter of the second bore region, and wherein a first end of the second cylinder is translatable within the first bore region and a second end of the second cylinder is translatable within the second bore region.

11. The fluid actuator mechanism of claim 9 wherein, when the second cylinder is at the first position and the piston is at the third position, the output shaft is at the first output position; and, when the second cylinder is at the second position and the piston is at the fourth position, the output shaft is at the second output position.

12. The fluid actuator mechanism of claim 9 wherein the third output position is centered between the first and second output positions.

13. The fluid actuator mechanism of claim 9, further comprising a control valve having first and second output ports in fluid communication with the first and second control ports, respectively, and wherein the control valve is configured to place the first and second control ports in fluid communication with a source of high-pressure fluid in the event that power to the control valve is removed.

14. The fluid actuator mechanism of claim 9 wherein the second cylinder includes a first working surface on which fluid pressure acts to bias the second cylinder toward the first position, and the piston includes a second working surface on which fluid pressure acts to bias the piston toward the third position.

15. The fluid actuator mechanism of claim 14 wherein the first cylinder includes a first control port and a first fluid chamber in fluid communication with the first control port, and wherein fluid pressure in the first fluid chamber acts on the first and second working surfaces.

16. The fluid actuator mechanism of claim 15 wherein the second cylinder includes a third working surface on which fluid pressure acts to bias the second cylinder toward the second position, and the piston includes a fourth working surface on which fluid pressure acts to bias the piston toward the fourth position.

17. The fluid actuator mechanism of claim 16 wherein the first cylinder includes a second control port and a second fluid chamber in fluid communication with the second control port, and wherein fluid pressure in the second fluid chamber acts on the third and fourth working surfaces.

18. The fluid actuator mechanism of claim 17 wherein:
a surface area of the fourth working surface is greater than a surface area of the second working surface; and
a sum of surface areas of the first and second working surfaces is greater than a sum of the surface areas of the third and fourth working surfaces.

19. The fluid actuator mechanism of claim 9, comprising:
a second fluid actuator having an additional output shaft movable between fourth and fifth output positions, the additional output shaft being coupled to the output shaft such that, when the output shaft is at the first output position, the additional output shaft is at the fifth output position, when the output shaft is at the second output position, the additional output shaft is at the fourth output position, and, when the output shaft is at the third output position, the additional output shaft is at a sixth output position located between the fourth and fifth output positions.

20. The fluid actuator mechanism of claim 19 wherein the first and second fluid actuators are arranged such that the piston of the first fluid actuator and the additional piston of the second actuator are translatable along respective axes that lie parallel to each other.

21. The fluid actuator mechanism of claim 19 wherein the first and second fluid actuators are arranged such that the piston of the first fluid actuator and the additional piston of the second actuator are translatable along a common axis.

22. The fluid actuator mechanism of claim 19, further comprising a rack of a rack and pinion mechanism, and wherein the output shaft and the additional output shaft are coupled at respective ends of the rack.

23. The fluid actuator mechanism of claim 19 wherein:
the first fluid actuator includes the first control port;
the second fluid actuator includes the second control port; and
when an equal fluid pressure is present at each of the first and second control ports, the output shaft is compelled to move to and stop at the third output position and the additional output shaft is compelled to move to and stop at the sixth output position.

24. The fluid actuator mechanism of claim 19 wherein the second fluid actuator includes:
a third cylinder having a third cylinder bore,
a fourth cylinder positioned within the third cylinder bore and translatable between fifth and sixth positions relative to the third cylinder, and having a fourth cylinder bore, and
an additional piston positioned within the fourth cylinder bore and translatable between seventh and eighth positions relative to the fourth cylinder, the additional piston being coupled to the additional output shaft.

25. The fluid actuator mechanism of claim 24 wherein:
the second cylinder includes a first working surface on which fluid pressure acts to bias the second cylinder toward the first position;
the piston includes a second working surface on which fluid pressure acts to bias the piston toward the third position;
the fourth cylinder includes a third working surface on which fluid pressure acts to bias the fourth cylinder toward the fifth position;
the additional piston includes a fourth working surface on which fluid pressure acts to bias the piston toward the seventh position;
the first cylinder includes a first control port and a first fluid chamber in fluid communication with the first control port;
the third cylinder includes a second control port and a second fluid chamber in fluid communication with the second control port;
fluid pressure in the first fluid chamber acts on the first and second working surfaces; and
fluid pressure in the second fluid chamber acts on the third and fourth working surfaces.

26. The fluid actuator mechanism of claim 25 wherein, when an equal fluid pressure is present at each of the first and second control ports, the second cylinder is compelled to move to the first position and the fourth cylinder is compelled to move to the fifth position, while the piston and additional piston are constrained by the second and fourth cylinders to the fourth and eighth positions, respectively.

27. A control valve, comprising:
first and second output ports;
a switching member movable to:
a first position in which the first and second output ports are closed,
a second position in which the first output port is placed in fluid communication with a first fluid source at a first pressure and the second output port is placed in fluid communication with a second fluid source at a second pressure different than the first pressure, a third position in which the first output port is placed in fluid communication with the second fluid source and the second output port is placed in fluid communication with the first fluid source, and a fourth position in which the first and second output ports are placed in fluid communication with the first fluid source;

a control mechanism configured to apply a control bias to move the switching member between the first, second, third, and fourth positions; and a return spring arranged to apply a return bias to the switching member toward the fourth position such that, in the absence of the control bias from the control mechanism, the switching member moves to and stops at the fourth position.

28. The control valve of claim 27 wherein the switching member is a spool.

29. The control valve of claim 27 wherein the position of the switching member is established in accordance with a level of the control bias relative to the return bias.

30. The control valve of claim 27 wherein the control mechanism is a solenoid arranged to apply a control bias to the switching member in opposition to the return bias.

31. A method of operating a fluid system and responding to a malfunction thereof, comprising:
enabling a flow of high-pressure fluid to a fluid port of an over-center fluid motor;
stroking the motor to an angle having an absolute value greater than zero;
destroking the motor to an angle of zero if control power to a control valve arranged to control an angle of an actuation mechanism is removed; and
removing control power from the control valve in response to a system malfunction.

32. The method of claim 31, further comprising:
disabling the flow of high-pressure fluid to the fluid port and placing the fluid port and an additional fluid port of the motor in two-way fluid communication, in the event of a system malfunction.

33. The method of claim 31 wherein the destroking step includes placing first and second control ports of the actuation mechanism in fluid communication with a high-pressure fluid source.

34. The method of claim 31, further comprising removing control power from the control valve in response to a shut down command.

35. A method for responding to a hydraulic system malfunction, comprising:
detecting a system malfunction;
upon detecting the system malfunction, closing a valve that controls a flow of high-pressure fluid to a high-pressure fluid port of an over-center hydraulic motor; and
upon detecting the system malfunction, opening a valve that is positioned to permit fluid flow around the motor from the high-pressure fluid port to a low-pressure fluid port of the motor.

36. The method of claim 35 wherein the opening of the valve comprises commanding the opening, to a reverse fluid flow, of a check valve arranged to normally permit one-way passage of fluid from the low-pressure fluid port to the high-pressure fluid port.

37. The method of claim 35 wherein the detecting a system malfunction comprises detecting a failure of a stroke angle of the motor to change in response to a stroke angle change command.

38. The method of claim 35 wherein the detecting a system malfunction comprises detecting a loss of power to an actuator control valve configured to regulate a pressurized fluid supply to an actuator that controls a stroke angle of the over-center motor.

39. A control valve, comprising:
first and second output ports;
a valve spool movable to:
a neutral position in which the first and second output ports are closed,
a first position, lying in a first direction from the neutral position, in which the first output port is placed in fluid communication with a first fluid source at a first pressure and the second output port is placed in fluid communication with a second fluid source at a second pressure different than the first pressure,
a second position, lying in a second direction opposite the first direction from the neutral position, in which the first output port is placed in fluid communication with the second fluid source and the second output port is placed in fluid communication with the first fluid source, and
a third position, lying beyond the first position in the first direction from the neutral position, in which the first and second output ports are placed in fluid communication with the first fluid source;
a control mechanism configured to apply a selectively variable control bias to urge the valve spool in the second direction; and
a spring arranged to apply a return bias urging the valve spool in the first direction, the return bias of the spring being sufficient to move the spool to the third position in the absence of a control bias from the control mechanism.

40. The control valve of claim 39 wherein the control mechanism is a solenoid.

41. A fluid system, comprising:
an over-center fluid operated motor having a first port for high-pressure fluid supply and a second port for low-pressure fluid supply; and
a check valve coupled between the first and second ports of the motor such that passage of fluid through the check valve from the first port to the second port is checked, while passage of fluid through the check valve from the second port to the first port is enabled, the check valve including a pilot control permitting selective opening of the valve such that, when opened, passage of fluid through the check valve from the first port to the second port is enabled.

42. A fluid actuator mechanism, comprising:
a first fluid actuator having:
a first control port, and
a first output shaft movable in an outward direction to a first output position and in an inward direction to a second output position, a third output position being located between the first and second output positions but not at either the first or the second output position;
a second fluid actuator having:
a second control port, and
a second output shaft movable in an outward direction to a fourth output position and in an inward direction to a fifth output position, a sixth output position being located between the fourth and fifth output positions but not at either the fourth or the fifth output position; wherein
the first and second output shafts are coupled so that when the first output shaft is at the first output position the second output shaft is at the fifth output position, when the first output shaft is at the second output position the second output shaft is at the fourth output position, and when the first output shaft is at the third output position the second output shaft is at the sixth output position; and the fluid actuator mechanism is configured such that when an equal fluid pressure is present at each of the first and second control ports, the first output shaft is compelled to move to and stop at the third output position and the second output shaft is compelled to move to and stop at the sixth output position.

43. An actuator system, comprising:
a first fluid actuator having a first output shaft with a range of motion extending between a first position and a second position and including a specific neutral position that is between the first position and the second position but not at either of the first position or the second position;
a first fluid control port coupled to the first fluid actuator such that fluid pressure at the first fluid control port biases the first output shaft toward the first position; and
a second fluid control port arranged such that fluid pressure at the second fluid control port biases the first output shaft toward the second position, the actuator system being configured such that the first output shaft is compelled to move to and stop at the specific neutral position when an equal fluid pressure is present at the first and the second fluid control ports.

44. The actuator system of claim 43 wherein the second fluid control port is coupled to the first fluid actuator.

45. The actuator system of claim 43, comprising a second fluid actuator having a second output shaft operatively coupled to the first output shaft so that the first and second output shafts move reciprocally, the second output shaft having a range of motion extending between third and fourth positions corresponding, respectively, to the first and second positions of the first output shaft, the second fluid control port being coupled to the second fluid actuator such that fluid pressure at the second fluid control port biases the second output shaft toward the fourth position.

46. The actuator system of claim 43 wherein the specific neutral position is defined by mechanical contact of elements of the actuator system.

47. The actuator system of claim 43 wherein:
the first fluid actuator includes a first piston with a large working surface and a small working surface, and the first output shaft is connected to the first piston, the first piston having a range of motion extending between first and second extremes, corresponding, respectively, to the first and the second positions; the actuation system further comprising:
a second actuator having a second, floating piston with a working surface, and a second output shaft, not physically connected to the second piston, the first and second output shafts operatively coupled so as to move reciprocally, the second piston having a range of motion extending between third and fourth extremes such that, when the first piston is at its first extreme, the first output shaft is at the first position and the second piston is at or near its third extreme, and when the second piston is at its fourth extreme, the first piston is near a midpoint between its first and second extremes and the first output shaft is at the specific neutral position.

48. The actuator system of claim 47 wherein a sum of the areas of the working surface of the second piston and the small working surface of the first piston is greater than an area of the large working surface of the first piston.

49. The actuator system of claim 47 wherein an area of the working surface of the second piston is greater than an area of the large working surface of the first piston.

50. The actuator system of claim 47 wherein:
the first fluid control port is coupled to the first fluid actuator such that fluid pressure at the first fluid control port acts on the large working surface of the first piston to bias the first piston toward the first extreme; and
the second fluid control port is coupled to the second actuator such that fluid pressure at the second fluid control port acts on the working surface of the second piston to bias the second piston toward the fourth extreme.

* * * * *